(12) United States Patent
Satran et al.

(10) Patent No.: US 7,112,013 B2
(45) Date of Patent: Sep. 26, 2006

(54) MILLING CUTTER

(75) Inventors: Amir Satran, Kfar Vradim (IL); Yaron Eisen, Kfar Vradim (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 11/289,436

(22) Filed: Nov. 30, 2005

(65) Prior Publication Data

US 2006/0120813 A1 Jun. 8, 2006

(30) Foreign Application Priority Data

Dec. 7, 2004 (IL) ........................................ 165620

(51) Int. Cl.
*B23C 1/00* (2006.01)
(52) U.S. Cl. .......................................... 407/48; 407/67
(58) Field of Classification Search .................. 407/48, 407/46, 47, 51, 52, 66, 67
See application file for complete search history.

(56) References Cited

U.S. PATENT DOCUMENTS

| | | | | |
|---|---|---|---|---|
| 2,989,800 A | * | 6/1961 | Comly | 407/40 |
| 3,172,437 A | * | 3/1965 | Hansen | 144/238 |
| 4,522,538 A | * | 6/1985 | Lindsay | 407/35 |
| 5,027,684 A | | 7/1991 | Peterson | |
| 5,238,037 A | * | 8/1993 | Gunzner et al. | 144/238 |
| 5,363,891 A | * | 11/1994 | Plante | 144/218 |
| 6,488,456 B1 | * | 12/2002 | Satran et al. | 409/234 |
| 6,571,451 B1 | * | 6/2003 | Satran et al. | 29/447 |
| 6,769,842 B1 | * | 8/2004 | Nerlich et al. | 407/61 |
| 6,772,810 B1 | * | 8/2004 | Bouchard et al. | 144/220 |

FOREIGN PATENT DOCUMENTS

DE 3536585 4/1987
GB 556376 8/1942

OTHER PUBLICATIONS

International Search Report, PCT/IL2005/001240, dated Feb. 13, 2006.

* cited by examiner

*Primary Examiner*—Willmon Fridie, Jr.
(74) *Attorney, Agent, or Firm*—Womble Carlyle

(57) ABSTRACT

A milling cutter with a disk like cutter body having radially directed slots and a central aperture. An exchangeable hub comprises two adapter members located on either side of the cutter body. One of the adapter members has a raised portion located in the central aperture. The adapter members are secured to the cutter body by means of pins which are located in blind holes in the adapter members and which pass through engagement members positioned in the slots.

12 Claims, 5 Drawing Sheets

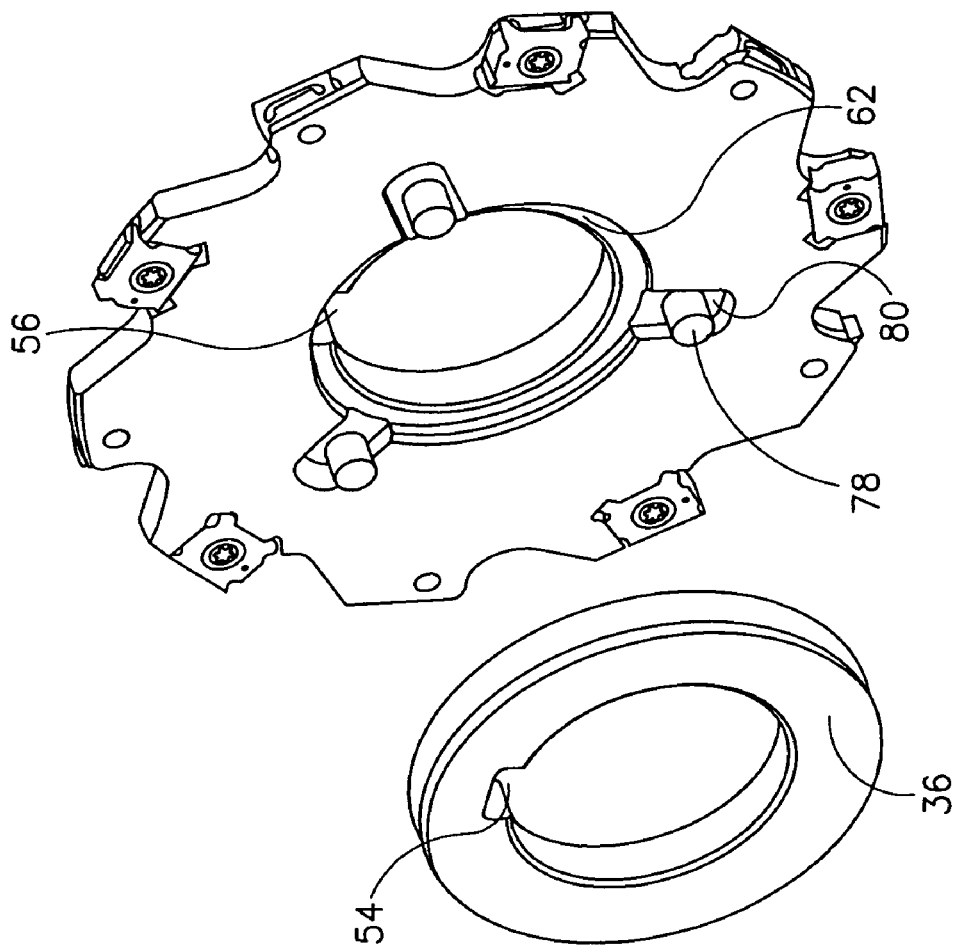
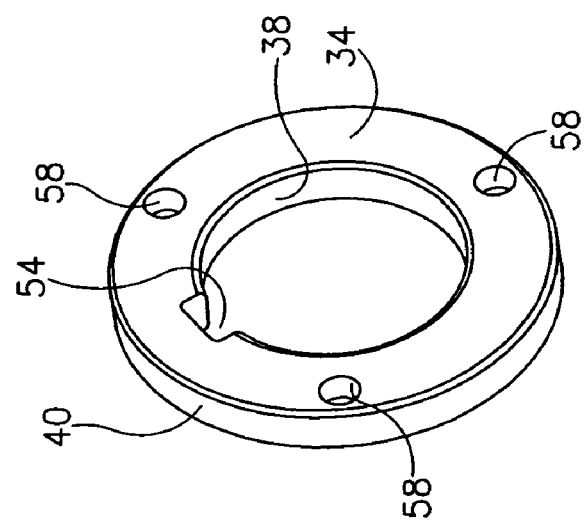
FIG. 5
FIG. 4

MILLING CUTTER

FIELD OF THE INVENTION

The present invention relates to milling cutters and in particular to milling cutters with disk like cutter bodies.

BACKGROUND OF THE INVENTION

Such milling cutters are typically used for slotting operations and have a hub with an axially centered hole for receipt of a support shaft of a machine spindle. Since the hole has a given diameter, the milling cutter can only be used with a shaft of a given diameter.

It is an object of the present invention to provide a milling cutter with an exchangeable hub. For such a milling cutter, hubs can be prepared with any required hole diameter. When it is required to use the milling cutter with a support shaft having a diameter different from that of the hole diameter, the hub which is attached to the cutter body can be removed and a new hub with the required diameter can be attached to the cutter body in its place. Milling cutters with exchangeable hubs are known, however they generally employ screws (or bolts) to attach the hub to the cutter body. The use of screws is time consuming and may be disadvantageous in that rotative motion is imparted by the hub to the cutter body via the screws, thereby exposing the screws to shear forces which could damage them.

SUMMARY OF THE INVENTION

In accordance with the present invention there is provided a milling cutter having an axis of rotation and comprising:

a generally disk-shaped cutter body, having two side surfaces and an outer peripheral surface therebetween, the axis of rotation being perpendicular to the side surfaces;

a plurality of circumferentially spaced apart cutting portions located around the outer peripheral surface of the cutter body;

a central aperture in the cutter body, having an aperture inner surface;

at least two radially directed slots in the cutter body, opening out to the central aperture;

two adapter members located on either side of the cutter body, each adapter member having an inner side wall in abutment with respective side surfaces of the cutter body, the two adapter members having identical central holes, one of the adapter members having an axially extending circularly shaped raised portion concentric with its central hole, the raised portion having an outer surface in juxtaposition with the aperture inner surface, each adapter member having at least two blind holes formed in the inner side walls and the raised portion having at least two recesses, each recess being adjacent a given blind hole, each recess being opposite a given slot, the blind holes of one adapter member being aligned with the blind holes of the other adapter member, thereby forming pairs of aligned blind holes;

an engagement member located partly in each slot and partly in an adjacent recess, the engagement member having a through hole, the through hole being located between and aligned with a given pair of blind holes, each through hole and associated pair of blind holes defining a chamber; and a pin located in each chamber.

If desired, the slots and the engagement members are generally rectangular in shape.

Typically, the chambers and the pins have generally matching shapes and dimensions.

If desired, the chambers and the pins are generally cylindrical in shape.

There is also provided in accordance with the present invention a method for constructing a milling cutter comprising the steps of:

(i) providing a generally disk-shaped cutter body, having first and second side surfaces and a central aperture and at least two radially directed slots opening out to the central aperture;

(ii) providing first and second adapter members, each adapter member comprising an identical central hole and an inner side wall having at least two blind holes formed therein, the second adapter member having an axially extending circularly shaped raised portion concentric with its central hole, the raised portion having an outer surface an inner surface, a recess formed in the raised portion adjacent each of the blind holes;

(iii) locating a pin in each blind hole of the second adapter;

(iv) placing the second adapter member adjacent the second side surface of the cutter body with the raised portion located in the aperture;

(v) positioning a generally rectangular engagement member having a through hole in each slot with the pin passing through the through hole and projecting from the engagement member.

(vi) placing the first adapter member adjacent the first side surface of the cutter body with each of its blind holes located opposite a given pin; and (vii) urging the first adapter member towards the cutter body until its inner side wall abuts the first side surface.

BRIEF DESCRIPTION OF THE DRAWINGS

For a better understanding of the present invention and to show how the same may be carried out in practice, reference will now be made to the accompanying drawings, in which:

FIG. 4 is a perspective view of a first adapter member showing its inner side wall;

FIG. 5 is the perspective view of the milling cutter shown in FIG. 1, with the first adapter member removed;

DETAILED DESCRIPTION OF PREFERRED EMBODIMENTS

Figure 2:
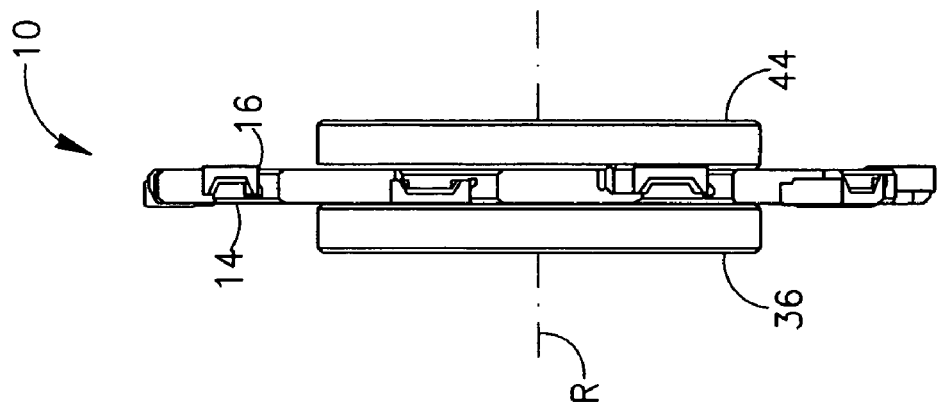
FIG. 2 is an edge view of the milling cutter shown in FIG. 1.
Figure 1:
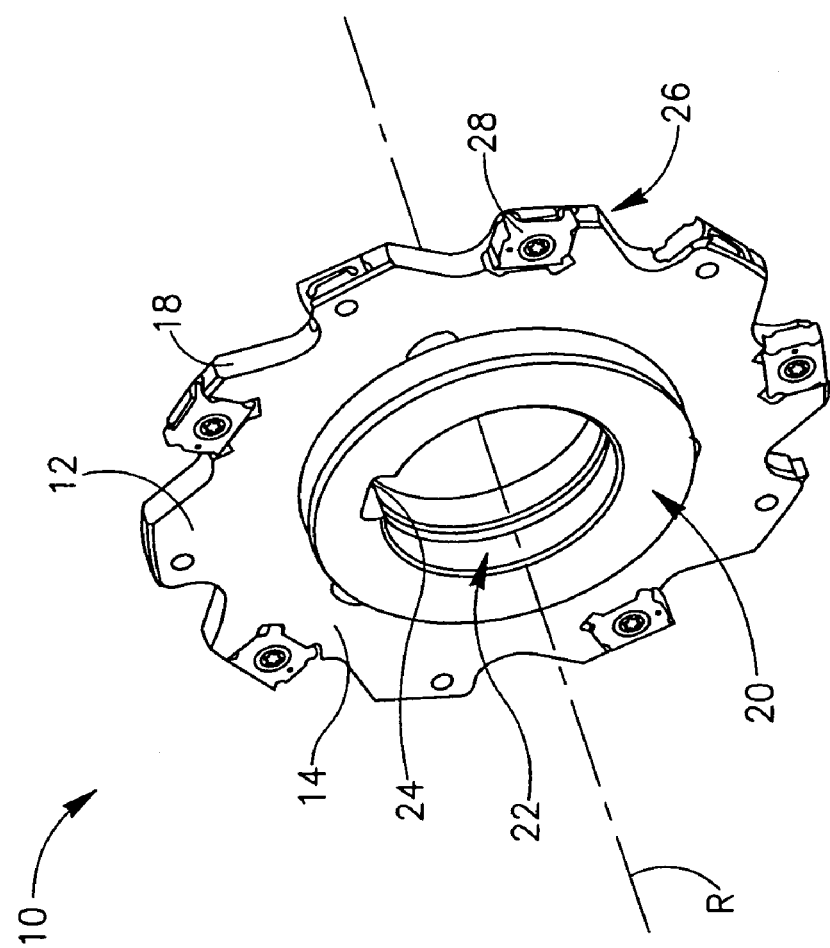
FIG. 1 is a perspective view of a milling cutter according to the present invention.

Attention is drawn to FIGS. 1 and 2, showing a milling cutter 10 in accordance with the present invention. The milling cutter 10 has a generally disk-shaped cutter body 12, having first and second opposing, generally parallel, side surfaces 14, 16 and an outer peripheral surface 18 extending between the two side surfaces 14, 16. The milling cutter 10 has an axis of rotation R which is perpendicular to the two side surfaces 14, 16. The milling cutter 10 has a hub 20 with an axially centered hole 22 for receipt of a support shaft of a machine spindle (not shown). Rotative motion is imparted to the hub 20 of the cutter via a drive key (also not shown) which mates with drive keyway 24. A plurality of circumferentially spaced apart cutting portions 26 are located around the outer peripheral surface 18 of the cutter body 12, each cutting portion 26 being provided with a cutting insert 28.

Figure 3:
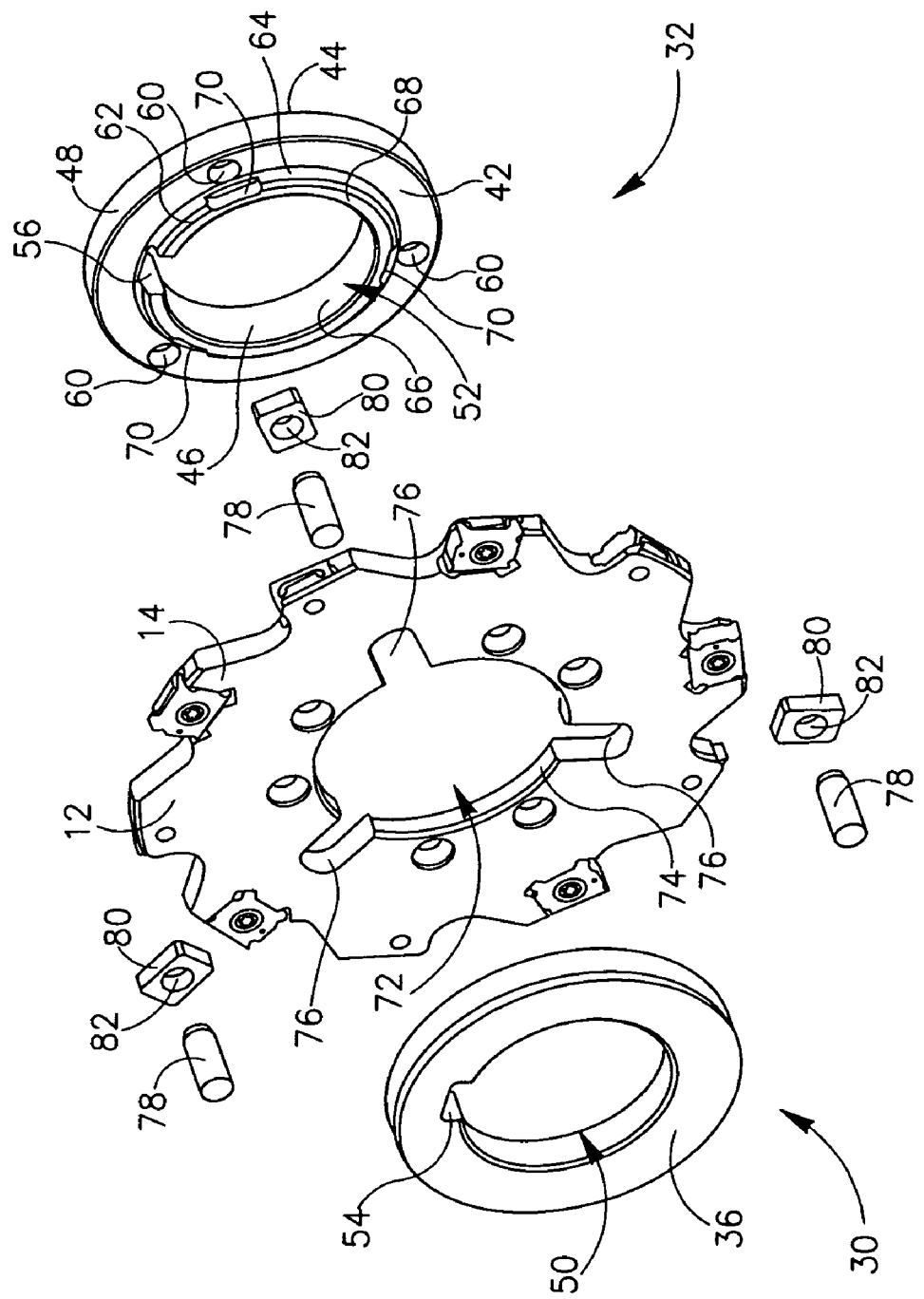
FIG. 3 is an exploded view of the milling cutter shown in FIG. 1.

Attention is now additionally drawn to FIGS. 3 and 4. The hub 20 comprises first and second adapter members 30, 32 located on either side of the cutter body 12. The first adapter member 30 has a first inner side wall 34, an opposing first outer side wall 36 and first inner and outer peripheral edge surfaces 38, 40 extending therebetween. Similarly, the second adapter member 32 has a second inner side wall 42, an opposing second outer side wall 44 and second inner and outer peripheral edge surfaces 46, 48 extending therebetween. The first and second adapter members 30, 32 have axially centered first and second member holes 50, 52, respectively. The first and second member holes 50, 52 form together the hole 22 of the hub 20. Similarly, the first and second adapter members 30, 32 have first and second drive keyway members 54, 56, respectively, which together form the drive keyway 24 of the hub 22.

The first adapter member 30 has three first blind holes 58 formed in the first inner side wall 34. Each of the first blind holes 58 is located at a given angular distance from the first drive keyway member 54. The second adapter member 32 has three second blind holes 60 formed in the second inner side wall 42. Each of the second blind holes 60 is located at the same given angular distance from the second drive keyway member 56 as the first blind holes 58 are located from the first drive keyway member 54. The second adapter member 32 has an axially extending circularly shaped raised portion 62 concentric with its central hole 52. The raised portion 62 has an outer surface 64 an inner surface 66 and an axially facing annularly shaped bridging surface 68 extending between the outer surface 64 the inner surface 66. The inner surface 66 forms part of the second inner peripheral edge surface 46. Adjacent each of the second blind holes 60 is a recess 70 formed in the raised portion 62 of the second adapter member 32. Each recess 70 opens out to the outer surface 64 and the bridging surface 68.

The cutter body 12 has a central aperture 72 bounded by an axially extending aperture inner surface 74. The cutter body 12 is provided with three radially directed generally rectangular slots 76 that open out to the central aperture 72 and to the first and second side surfaces 14, 16.

The milling cutter 10 is assembled by first locating a pin 78 in each second blind hole 60. The pin 78 is generally cylindrical in shape having a longitudinal axis P generally parallel to the axis of rotation R of the milling cutter 10. The diameter of each second blind hole 60 is preferably slightly smaller than the diameter of the pin 78 located therein thereby ensuring that the pin 78 is located in a close-fitting manner in the second blind hole 60. Such an arrangement ensures that the pins 78 will not fall out of the second blind holes 60 during assembly of the milling cutter 10.

The second adapter member 32 is then placed adjacent the second side surface 16 with raised portion 62 located adjacent the aperture 72. The second adapter member 32 is urged towards the cutter body 12 until the second inner side wall 42 abuts the second side surface 16 with each recess 70 being opposite a given slot 76. In this position the raised portion 62 is fully inside the aperture 72 with the outer surface 64 in juxtaposition with the aperture inner surface 74.

Figure 7:
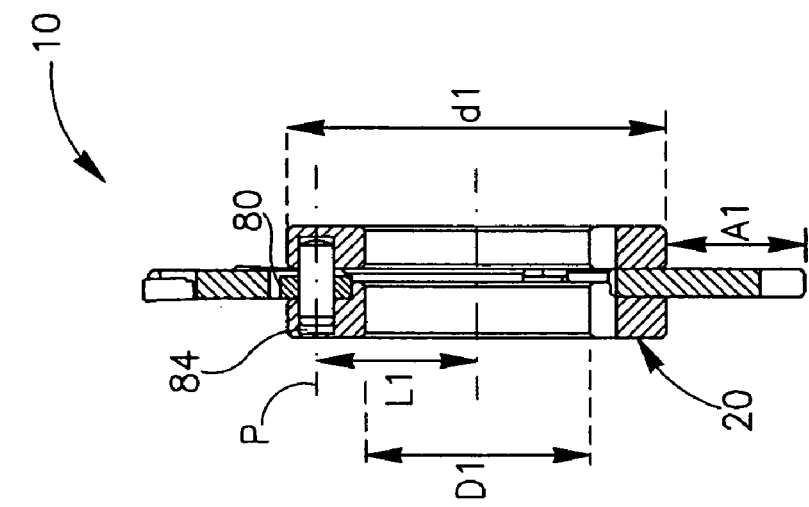
FIG. 7 is a cross sectional view taken along the line VII—VII in FIG. 6, but with the first adapter member attached.
Figure 6:
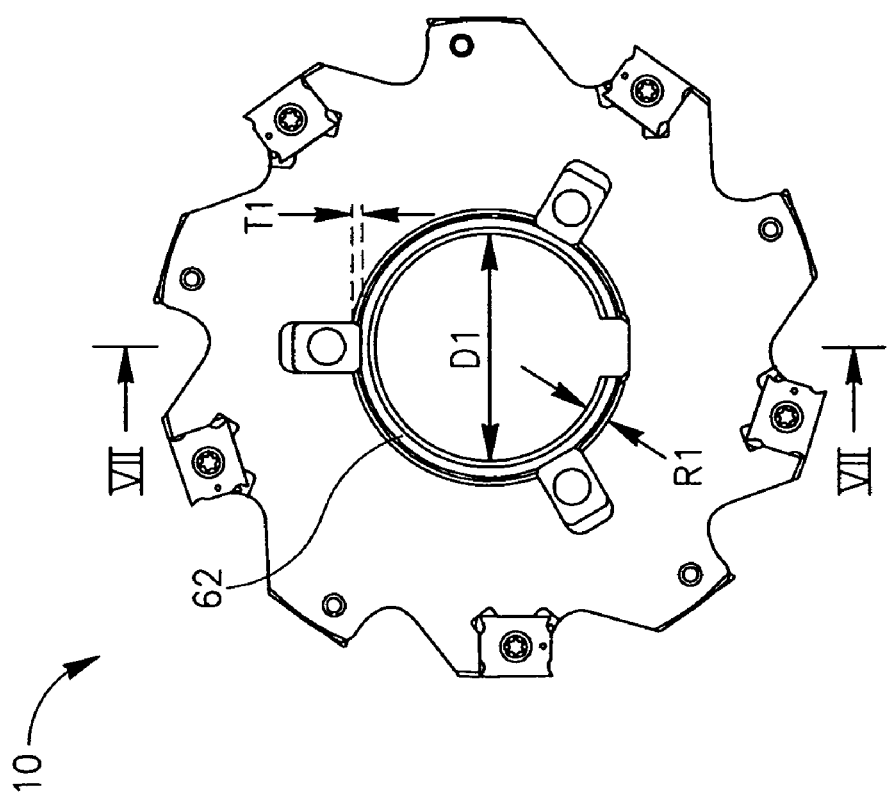
FIG. 6 is a side view of the milling cutter shown in FIG. 1 with the first adapter member removed.

A generally rectangular engagement member 80 having a through hole 82 is positioned in each slot 76 with the pin 78 passing through the through hole 82 and projecting from the engagement member 80. The dimensions of the engagement member 80 are designed so that it will be located partly in each slot 76 and partly in an adjacent recess 70. The milling cutter 10 is now partially assembled as shown in FIG. 5. All that remains is to attach the first adapter member 30 to the partially assembled milling cutter 10. This is done by placing the first adapter member 30 adjacent the first side surface 14 with each first blind hole 58 located opposite a given pin 78 and with the first drive keyway member 54 aligned with the second drive keyway member 56. The first adapter member 30 is then urged towards the cutter body 12 until the first inner side wall 34 abuts the first side surface 14, thereby bringing the milling cutter 10 into an assembled state, that is forming the milling cutter 10, as shown in FIGS. 1, 6 and 7. The assembly of the milling cutter 10, in accordance with the order of operations, as described above is by no means binding. The assembly of the milling cutter 10 can be carried in out in any desired feasible order.

In the assembled state, each first blind hole 58 is located opposite and aligned with a given second blind hole 60, thereby forming pairs of aligned blind holes. The through hole 82 of each engagement member 80 is located between and aligned with a given pair of blind holes. Each through hole 82 and associated pair of blind holes defines a generally cylindrical shaped chamber 84 in which a given pin 78 is located (see FIG. 7). The chambers 84 and the pins 78 have generally matching shapes and dimensions and the longitudinal axis P of the pin 78 is also the longitudinal axis of the chamber 84. However, as mentioned above the diameter of the second blind holes 60 are preferably slightly smaller than the diameter of the pins 78. Moreover, the diameter of the first blind holes 58 is preferably slightly larger than the diameter of the pins 78 to enable easy insertion of the pins 78 into the first blind holes 58 when attaching the first adapter member 30 to the partially assembled milling cutter 10, as described above.

As mentioned above, the hole 22 of the hub 20 receives a support shaft of a machine spindle for rotating the milling cutter 10. Wherein, rotative motion is imparted to the hub 20 via a drive key of the support shaft which mates with drive keyway 24. In turn, the hub 20 imparts rotative motion to the cutter body 12 via the coupling between the pins 78 and the blind holes 58, 60, between the pins 78 and the engagement members 80 and between the engagement members 80 and the slots 76.

With respect to FIGS. 6 and 7, the following five parameters are defined: the hole diameter D1 of the hub 20 (which is equal to the diameters of the first and second member holes 50, 52), the radial thickness R1 of the raised portion 62, the radial depth T1 of each recess 70 and the depth of cut A1 of the milling cutter, and the distance L1 of the chamber axis P from the axis R of the milling cutter 10. These parameters are required when comparing two similar milling cutters as will be done below.

The milling cutter 10 shown in FIGS. 1 to 7, can only be used in conjunction with a support shaft having a diameter generally equal to, but slightly less than, the diameter D1 of the hole 22 of the hub. If the milling cutter is to be used with a different machine spindle having a support shaft with a different diameter, then a hub having a hole with an appropriate diameter (generally equal to, but slightly greater than, the diameter of the support shaft) has to be used.

Figure 9:
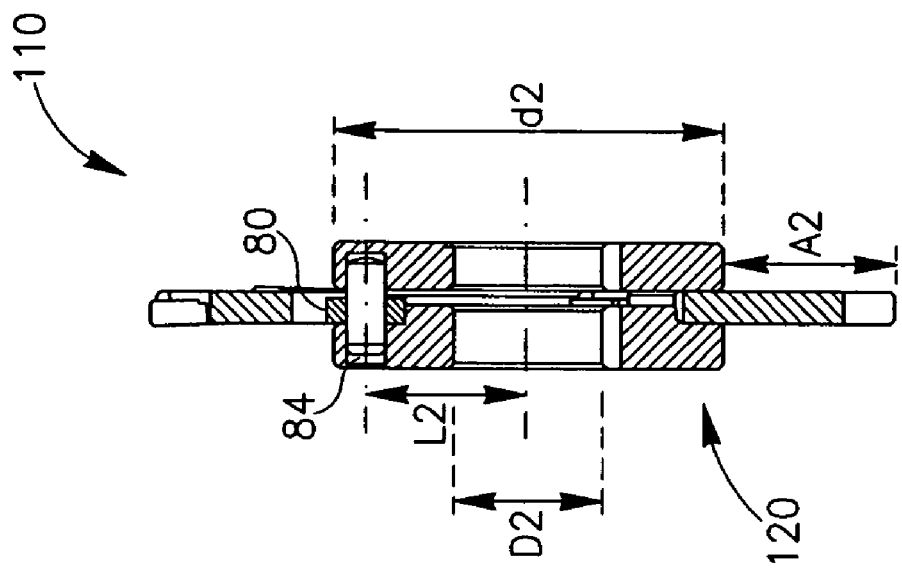
FIG. 9 is a cross sectional view taken along the line IX—IX in FIG. 8, but with the first adapter member attached.
Figure 8:
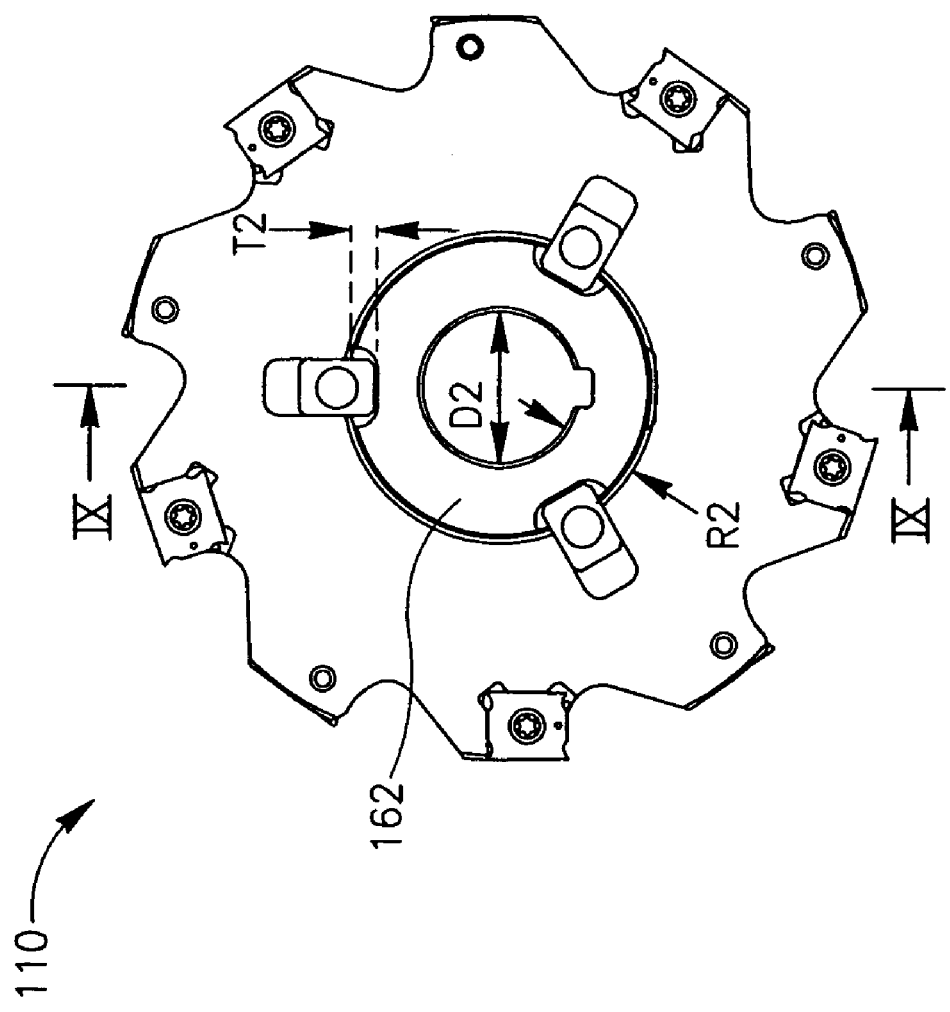
FIG. 8 is a side view of the milling cutter in accordance with the present invention with a hub having a different diameter to that shown in FIGS. 1 to 7, with the first adapter member removed.

Attention is now drawn to FIGS. 8 and 9, showing a milling cutter 110, referred to hereinbelow as the second milling cutter, suitable for use with a support shaft having a smaller diameter than the milling cutter 10 shown in FIGS. 1 to 7, referred to hereinbelow as the first milling cutter. The hole diameter D2 of the hub 120 of the second milling cutter 110 is smaller than the hole diameter D1 of the hub 20 of the first milling cutter 10. The radial thickness R2 of the raised portion 162 of the hub 120 of the second milling cutter 110 is larger than the radial thickness R1 of the raised portion 62 of the hub 20 of the first milling cutter 10. As a consequence, the radial depth T2 of each recess 70 of the second milling cutter 110 can be made larger than the radial depth T1 of each recess 70 of the first milling cutter 10. This in turns makes it possible to form the chamber 84 of the second milling cutter 110 closer to the axis of rotation R of than in the case of the first milling cutter 10. In other words, the distance L2 of the chamber axis P from the axis R of the second milling cutter 110 is less than the distance L1 of the chamber axis P from the axis R of the first milling cutter 10. The hub diameter d2 of the second milling cutter 110 is smaller than the hub diameter d1 of the first milling cutter 10, a direct result of the positioning of the chamber 84 of the second milling cutter 10 closer to the axis of rotation R of the milling cutter. As a result, the second milling cutter 110 has a greater depth of cut A2 than the depth of cut A1 of the first milling cutter 10.

It will be appreciated that the present invention not only provides a particularly efficient way of changing adapters in accordance with the diameter of the spindle support shaft, but at the same time facilitates increasing the depth of cut of the milling cutter.

Although the present invention has been described to a certain degree of particularity, it should be understood that various alterations and modifications could be made without departing from the scope of the invention as hereinafter claimed.

What is claimed is:

1. A milling cutter having an axis of rotation and comprising:
   a generally disk-shaped cutter body, having two side surfaces and an outer peripheral surface therebetween, the axis of rotation being perpendicular to the side surfaces;
   a plurality of circumferentially spaced apart cutting portions located around the outer peripheral surface of the cutter body;
   a central aperture in the cutter body, having an aperture inner surface;
   at least two radially directed slots in the cutter body, opening out to the central aperture;
   two adapter members located on either side of the cutter body, each adapter member having an inner side wall in abutment with respective side surfaces of the cutter body, the two adapter members having identical central holes, one of the adapter members having an axially extending circularly shaped raised portion concentric with its central hole, the raised portion having an outer surface in juxtaposition with the aperture inner surface, each adapter member having at least two blind holes formed in the inner side walls and the raised portion having at least two recesses, each recess being adjacent a given blind hole, each recess being opposite a given slot, the blind holes of one adapter member being aligned with the blind holes of the other adapter member, thereby forming pairs of aligned blind holes;
   an engagement member located partly in each slot and partly in an adjacent recess, the engagement member having a through hole, the through hole being located between and aligned with a given pair of blind holes, each through hole and associated pair of blind holes defining a chamber; and
   a pin located in each chamber.

2. The milling cutter according to claim 1, wherein the slots and the engagement members are generally rectangular in shape.

3. The milling cutter according to claim 1, wherein the chambers and the pins have generally matching shapes and dimensions.

4. The milling cutter according to claim 3, wherein the chambers and the pins are generally cylindrical in shape.

5. A method for constructing a milling cutter comprising the steps of:
   (i) providing a generally disk-shaped cutter body, having first and second side surfaces and a central aperture and at least two radially directed slots opening out to the central aperture;
   (ii) providing first and second adapter members, each adapter member comprising an identical central hole and an inner side wall having at least two blind holes formed therein, the second adapter member having an axially extending circularly shaped raised portion concentric with its central hole, the raised portion having an outer surface an inner surface, a recess formed in the raised portion adjacent each of the blind holes;
   (iii) locating a pin in each blind hole of the second adapter;
   (iv) placing the second adapter member adjacent the second side surface of the cutter body with the raised portion located in the aperture;
   (v) positioning a generally rectangular engagement member having a through hole in each slot with the pin passing through the through hole and projecting from the engagement member.
   (vi) placing the first adapter member adjacent the first side surface of the cutter body with each of its blind holes located opposite a given pin; and
   (vii) urging the first adapter member towards the cutter body until its inner side wall abuts the first side surface.

6. A milling cutter having an axis of rotation and comprising:
   a generally disk-shaped cutter body comprising:
      two side surfaces and an outer peripheral surface therebetween, the axis of rotation being perpendicular to the two side surfaces;
      a plurality of circumferentially spaced apart cutting portions located around the outer peripheral surface of the cutter body;
      a central aperture in the cutter body; and
      at least two radially directed slots in the cutter body, each slot opening out to the central aperture;
   a hub mounted on the disk-shaped cutter body, the hub comprising:
      two adapter members, one adapter member located on either side of the cutter body, each adapter member having an inner side wall and at least two blind holes formed in said inner side wall, the blind holes of one adapter member being aligned with the blind holes of the other adapter member, thereby forming pairs of aligned blind holes;

an engagement member located in each slot, the engagement member having a through hole, the through hole being located between and aligned with a given pair of blind holes; and a pin occupying the through hole and also a corresponding pair of blind holes, thereby securing the adapter members to the disk shaped cutter body.

7. The milling cutter according claim 6, wherein:
the central aperture has an aperture inner surface;
each adapter member has a central hole;
the inner side wall of each adapter member abuts a respective side surface of the cutter body; and
one of the two adapter members has an axially extending circularly shaped raised portion concentric with its central hole, the raised portion having an outer surface in juxtaposition with the aperture inner surface.

8. The milling cutter according claim 7, wherein:
the raised portion has at least two recesses, each recess being adjacent a given blind hole and opposite a given slot; and
the engagement member is located partly in a corresponding slot and partly in an adjacent recess.

9. The milling cutter according to claim 6, wherein the slots and the engagement members are generally rectangular in shape.

10. The milling cutter according claim 6, wherein:
the engagement member and its corresponding pair of blind holes together form a chamber.

11. The milling cutter according to claim 10, wherein the chamber and the pin have generally matching shapes and dimensions.

12. The milling cutter according to claim 10, wherein the chamber and the pin are generally cylindrical in shape.

* * * * *